United States Patent [19]

Harney et al.

[11] Patent Number: 5,053,903

[45] Date of Patent: Oct. 1, 1991

[54] DISK CLAMP POSITIONING APPARATUS FOR INFORMATION STORAGE DISK DRIVE SYSTEM

[75] Inventors: James D. Harney, Rochester, N.Y.; Ronald A. Carin, San Jose, Calif.; James R. Carey, Rochester; Philip R. Ashe, Hilton, both of N.Y.

[73] Assignee: Literal Corporation, Colorado Springs, Colo.

[21] Appl. No.: 329,467

[22] Filed: Mar. 28, 1989

[51] Int. Cl.⁵ .................... G11B 17/04; G11B 17/02
[52] U.S. Cl. .................... 360/99.06; 360/99.09; 360/99.12; 369/270
[58] Field of Search ............ 360/99.12, 99.06, 99.09, 360/99.02, 99.05; 369/290, 77.2

[56] References Cited

U.S. PATENT DOCUMENTS

| | | | |
|---|---|---|---|
| 4,340,952 | 7/1982 | Ikedo | 369/77 |
| 4,351,046 | 9/1982 | Elliott | 369/233 |
| 4,470,136 | 9/1984 | Takahashi et al. | 369/77.1 |
| 4,539,671 | 9/1985 | Higashihara | 369/370 X |
| 4,564,930 | 1/1986 | Funabashi et al. | 369/270 |
| 4,654,840 | 3/1987 | Takahashi | 360/99.12 X |
| 4,730,300 | 3/1988 | Kamoshita et al. | 369/270 |
| 4,745,500 | 5/1988 | Davis | 360/99.06 |

Primary Examiner—Aristotelis M. Psitos
Assistant Examiner—Andrew L. Sniezek
Attorney, Agent, or Firm—Kinney & Lange

[57] ABSTRACT

In an optical or magneto-optical disk drive system adapted to receive a shuttered disk cartridge, interference between the disk clamp and the shutter during cartridge insertion is obviated by securing the clamp onto a sliding mount plate which is normally biased to hold the clamp in a rearward position displaced from its normal operating position in alignment with the disk spindle-drive. A drive cam engaged by the leading edge of the cartridge during insertion is drivingly coupled to the mount plate by a double rack and pinion arrangement to drive the mount plate forward into normal operating position after the cartridge shutter is opened. To assure that the clamp is firmly positioned in alignment with the disk spindle-drive, the pinion is compliantly mounted to allow slight overtravel of the drive cam after the clamp mount is arrested by the precision stop thus exerting a forward bias force to the amount plate which holds the clamp mount firmly in place.

3 Claims, 4 Drawing Sheets

DISK CLAMP POSITIONING APPARATUS FOR INFORMATION STORAGE DISK DRIVE SYSTEM

FIELD OF THE INVENTION

This invention relates to information storage disk drive systems and more particularly to apparatus for positioning a disk clamp device during cartridge loading and unloading operation.

BACKGROUND OF THE INVENTION

In beam addressable information storage systems, of either optical or magneto-optical type, it is critically important that the information storage disk be very precisely oriented relative to the read/write head in the disk drive system. In general, this may be accomplished by clamping the central hub opening of the disk onto a precisely oriented disk spindle-drive which is provided with a centering cone to position the disk at the correct axis of rotation and with a drive chuck surface which is precision oriented to maintain the disk in the desired plane of rotation during the read/write function. Accordingly, provision must be made for a suitable clamping device to be operative after the disk is inserted to clamp the disk to the spindle-drive.

For optimum utilization of available space in a compactly designed disk drive system, it is desirable to provide insertion guide means which is adapted to receive the disk and hold it in its plane of insertion during the read/write function. With an arrangement of this type, the spindle-drive is translated axially into engagement with the disk after the cartridge reaches its final operative position. The clamp, located opposite the disk from the spindle-drive, then operates to clamp the disk to the drive chuck surface. Here again, conservation of space makes it desirable that the clamp mount be kept as close to the disk as possible during the loading process, preferably with no movement of the clamp mount in the disk axial direction.

To protect the storage disk from the effects of dust and fingerprints, it is well known to enclose the information storage disk in a protective shell or cartridge provided with a normally closed shutter that is automatically opened when the cartridge is loaded into the disk drive system so as to expose a segment of recording tracks to the read/write head through an access aperture formed in the cartridge. It is desirable that the shutter not be opened until at least that portion of the aperture exposing the recording tracks is within the disk drive system to insure that the disk is not accidentally touched by the user during insertion. However, because the disk clamp and read/write components are normally in close proximity to the surface of the disk, typically within 1-2 millimeters, and it is preferable not to move these components axially of the disk, even during cartridge insertion, it is necessary that the shutter be opened early enough during insertion to allow the clamp and read/write components to clear the shutter and nest within the disk access opening as the cartridge is being inserted.

It has been found that the conflict between the need to keep the shutter closed during the initial insertion of the cartridge and the need to open the shutter soon enough to clear the read/write components can be accommodated by a fast acting shutter opening mechanism. However, the geometry is such that it is necessary to move or retract the clamp device in order to clear the shutter. Once the shutter is opened, provision can then be made to reposition the clamp device into its normal operating position in axial alignment with the spindle-drive. Any mechanism used to move the disk clamp to accommodate the cartridge loading process must assure precise alignment and firm seating of the clamp in its final operative position, preferably without the use of costly precision parts.

In the case of a magneto-optical information storage disk drive system, the read/write components include an electromagnetic bias coil which also must be maintained in close proximity to the recording tracks of the disk. As with the read/write head and the disk clamp, this coil must also be nested within the disk access aperture of the cartridge and, as a consequence, it is desirable that the apparatus employed to position the disk clamp also be used to position the bias coil.

It is therefore an object of the present invention to provide disk clamp positioning apparatus for a compactly designed beam addressable information storage disk drive system.

It is another object of the invention to provide disk clamp positioning apparatus that precisely positions the disk clamp in axial alignment with a corresponding spindle-drive while at the same time allowing for delayed opening of a cartridge shutter during the cartridge loading operation. It is another object of the invention to provide disk clamp positioning apparatus that precisely positions and holds the disk clamp firmly in alignment with the spindle-drive without the need for costly precision parts.

It is yet another object of the invention to provide disk clamp positioning apparatus of the type described that also functions to position an electromagnetic bias coil in close poximity to the recording tracks of a magneto-optical information storage disk.

SUMMARY OF THE INVENTION

In accordance with the invention, therefore, there is provided disk clamp positioning apparatus for an information storage disk drive system of the type having cartridge guide adapted to receive a disk cartridge along an insertion path, the cartridge having a shutter movable transversely of the insertion path to uncover a disk access aperture which exposes a segment of recording tracks on the disk. The disk drive system contemplated by the invention also has a mechanism adapted to open the shutter after the cartridge is inserted to a position at which the segment of recording tracks is substantially within the cartridge guide. The system further has a disk spindle-drive aligned with a central drive opening of the disk when the disk cartridge is loaded into its final operative position in the guide.

In a preferred embodiment of the invention for the system as just described, apparatus for positioning a disk drive clamp in coaxial alignment with the spindly-drive comprises a clamp mounting plate translatable on the cartridge guide in a path parallel with the cartridge insertion path between a retracted position with the clamp displaced from the axis of the spindle-drive and an operative position with the clamp coaxially aligned with the spindle-drive. The apparatus also includes a drive cam translatable on the cartridge guide in a path parallel with the translation path of the clamp mounting plate and a double rack and pinion gear drive mechanism drivingly coupling said drive cam to said clamp mounting plate. In a particularly preferred embodiment of the invention, a precision stop is provided to arrest the movement of the clamp mounting plate at proper location and the pinion of the rack and pinion mechanism is compliantly mounted to permit overtravel of the drive cam after movement of the mounting plate is arrested by the precision stop thus assuring that the clamp is held securely in its operative position.

DETAILED DESCRIPTION

Figure 1:
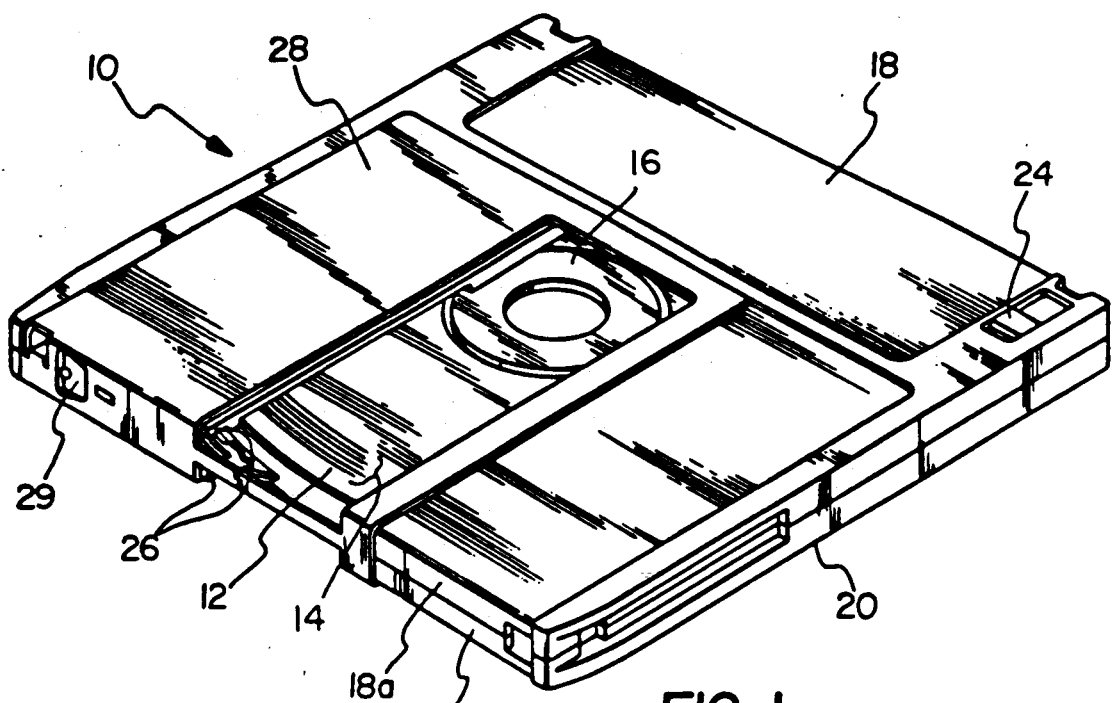
FIG. 1 is a perspective view of an information storage disk cartridge of the type for which the present invention is particularly adapted.

In FIG. 1, an information storage disk cartridge 10, with which the present invention is particularly adapted for use, includes a disk 12 adapted for recording data on, and playing data back from, a plurality of data recording tracks encircling a central spindle-drive region 16 of the disk. Preferably, the recording surface of the disk is comprised of magneto-optical or optical recording media although strictly magnetic recording media might also be used. Cartridge 10 comprises a top plate 18 and a bottom plate 20 composed of a material to provide structural rigidity. Preferably, both plates 18 and 20 are plastic and are formed by a commercially available injection molding operation.

The top plate 18 and bottom plate 20 may be of any standard size to permit rotatable movement of the disk 12 therebetween about a central axis of rotation. To that end, each plate 18, 20 has an integral peripheral lip 18a, 20a, respectively, cooperatively forming a surrounding peripheral wall which serves to space the lower surface of top plate 18 from the upper surface of bottom plate 20 thus defining a generally enclosed rigid compartment in which the disk 12 is contained for rotatable movement. A write protection device, indicated generally by reference numeral 24, is located near a corner of the cartridge where it does not interfere with the disk 12.

An aligned pair of elongate access openings 26 is provided in cartridge 10 to permit operational access to the recording tracks of disk 12 when the cartridge is operatively loaded into a disk drive system. Access openings 26 preferably are extended to encompass the central hub region 16 of disk 12, at least in the top plate 18. A spring-biased generally U-shaped shutter 28 serves for automatically covering the access openings 26 to protect the disk 12 from adverse external effects such as dirt, lint, fingerprints and the like, when cartridge 10 is removed from the disk drive system. For this purpose, shutter 28 is mounted for slidable movement laterally along the front peripheral wall between a normally closed position in which access openings 26 are covered and the fully open position illustrated in FIG. 1 in which access openings 26 are uncovered to expose a segment of recording tracks 14 on disk 12. A notch 29 is formed in the forward edge of shutter 28 and serves as a point of engagement of a shutter opening lever, described later, to cause the opening of shutter 28 as it is inserted into a disk storage system.

Figure 2:
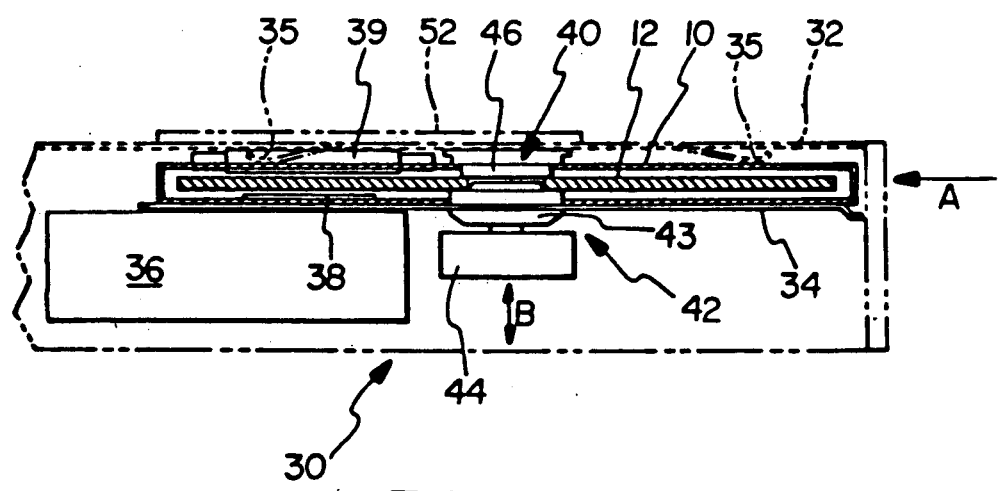
FIG. 2 is a side schematic view of an information storage disk drive system useful in describing the present invention.

Referring to FIG. 2, there is schematically represented an information storage disk drive system 30 which includes upper and lower cartridge guide plates 32,34 adapted to receive cartridge 10 along an insertion path, represented by arrow A. Spring fingers 35 may be provided on upper guide plate 32 to urge cartridge 10 firmly against lower guide plate 34. When cartridge 10 is inserted in this manner into disk drive system 30, disk 12 slides between a read/write head 36, with its objective lens 38 positioned below disk 12 and a disk clamp 40 and an electromagnetic bias coil 39 positioned above disk 12. For optimum performance of the record/playback function, it is preferred that the objective lens 38 and the bias coil 39 be as close as possible to the surface of the disk 12, without touching, and a spacing of about 1-2 millimeters is typical. As a result, the objective lens 38 and bias coil 39 are nested in lower and upper access openings 26, respectively, when cartridge 10 is in its final operative position shown in FIG. 2.

Drive system 30 also includes a spindledrive 42, comprised of spindle chuck 43 and spindle drive motor 44 which is preferably reciprocally translatable in the direction of arrow B between upper and lower positions by a lift/retract mechanism (not shown). In the lower position, spindle-drive 42 is retracted to a position below the level of lower guide plate 34 to allow insertion and removal of cartridge 10 from disk drive system 30. In its upper position, as illustrated in the drawing, the drive surface of drive chuck 43 is lifted into engagement with the lower surface of disk 12 at its central hub region 16 and, together with drive motor 44, serves to rotationally drive disk 12 during read/write operation of the system. In order to hold disk 12 firmly on the drive chuck 43, a disk clamp 40 is affixed to a retractable clamp mounting plate 52 translatably secured on upper guide plate 32. Clamp 40 preferably includes an axially movable magnet 46 adapted to be attracted to the magnetic material of spindle-drive 42 when the latter is lifted into engagement with disk 12, the magnetic attraction providing the necessary clamping force to hold disk 12 firmly on the drive surface of drive chuck 43. Clamp 40 is fixed in the axial direction of disk 12 and is nested in upper aperture 26 when cartridge 10 is inserted into disk drive system 30.

Figure 3:
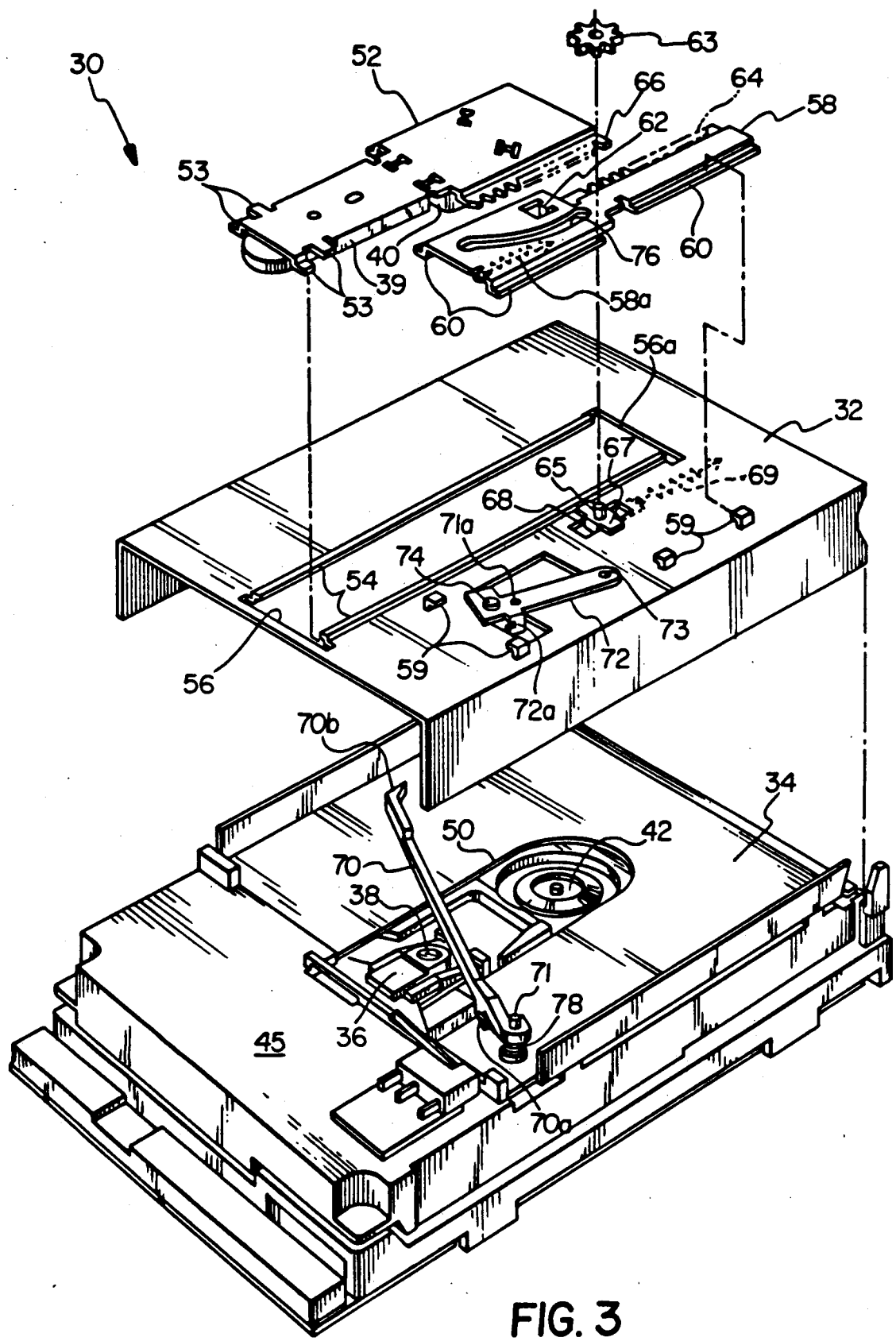
FIG. 3 is an exploded perspective view of the disk drive system of FIG. 2 illustrating disk clamping apparatus of the present invention.

Referring now to FIG. 3, positioning apparatus of the invention is shown for the load mechanism of a disk drive system. To this end guide means for receiving a disk cartridge of the type described along an insertion path and for holding the cartridge in its plane of insertion includes lower guide plate 34 and upper guide plate 32, the latter also serving as an upper housing for the load mechanism of the disk drive system. Lower guide plate 34 is mounted on a skirted central mounting plate 45 which houses read/write head 36 and various drive components of the disk drive system 30. Lower guide plate 34 is provided with an elongated aperture 50 through which objective lens 38, of read/write head 36, and spindle-drive 42 project via respective apertures in central mount plate 45 to provide access to the storage disk when a cartridge has been inserted. Bias coil 39 and disk clamp 40 are secured to the underside of a translatable clamp mounting plate 52 slidably mounted on upper guide plate 32 by a plurality of tabs 53 captured onto the side rails 54 of an elongated slot opening 56 formed in the upper guide plate 32. Mount plate 52 is arranged to slide reciprocally from a rear position in slot 56 (left, as viewed in the drawing) to a forward position (right, in the drawing) as cartridge 10 is inserted into the disk drive system. When mount plate 52 is in its forward position, the forward edge of clamp 40 abuts the forward end 56a of slot 56. While this is the presently preferred structure for precisely locating clamp 40 in axial alignment with spindle-drive 42, it will be appreciated that other precision stop arrangements may be provided; as, for example, a tab formed on the upper surface of guide plate 32 positioned for abutment by the forward edge of sliding mount plate 52 when clamp 40 and spindle-drive 42 are axially aligned.

The mechanism for causing mount plate 52 to slide forward when a cartridge is inserted includes drive cam 58 slidably mounted on the top surface of upper guide plate 32 by means of side rails 60 captured in holding tabs 59. Drive cam 58 is provided with a downwardly depending drive tab 62 adapted to be engaged by the leading edge of cartridge 10 during insertion into the disk drive system. Drive cam 58 is drivingly coupled to clamp mount plate 52 by means of a double rack and pinion arrangement comprised of pinion 63 engaged between parallel racks 64,66 formed on the sides of drive cam 58 and mount plate 52, respectively. In accordance with a feature of the invention, pinion 63 is compliantly mounted between racks 64,66 via pin 65 formed on a bracket 67 which is slidably mounted in slot 68 and biased forwardly by means of tension spring 69 having its forward end attached by suitable means to upper guide plate 32. When no cartridge is in position in the guide means of disk drive system 30, mount plate 52 is held in its retracted position by drive cam 58 which is biased forwardly by a tension spring 58a having its forward end attached to upper guide plate 32 by suitable means.

To provide for opening of the cartridge shutter when the cartridge is inserted, a pivotable shutter opening lever 70 is positioned in the guide means between upper and lower guide plates 32,34 by means of a movable pivot pin 71 journaled in hole 71a near the end of a pivotable mounting arm 72. Arm 72 is pivotably mounted at 73 to the top surface of upper guide plate 32 beneath a raised section of drive cam 58 and includes a follower pin 74 riding in a curved slot 76 formed in drive cam 58. Shutter opening lever 70 is urged forwardly by a bias spring 78 mounted concentrically on pivot pin 71 with one end held in a notch 70a on lever 70 and the other end in a notched tab 72a on pivotable mounting arm 72. When biased forward with no cartridge loaded in the guide means, lever 70 may be held in a notched tab (not shown) projecting upwards through a slot in lower guide plate 34 from a sliding bracket (not shown) positioned underneath plate 34. Lever 70 is provided with a pointed end 70b comprising a shutter engaging member adapted to engage the shutter in notch 29 (FIG. 1) as the cartridge is inserted into the disk drive. As will be seen subsequently, lever 70 is held by the aforementioned notched tab at an angle crosswise of the guide means with the pointed end 70b so positioned in the guide means as to engage the cartridge shutter only after the cartridge has been inserted to a point at which the recording track segment of disk 12 is substantially within the guide means.

Figure 4A:
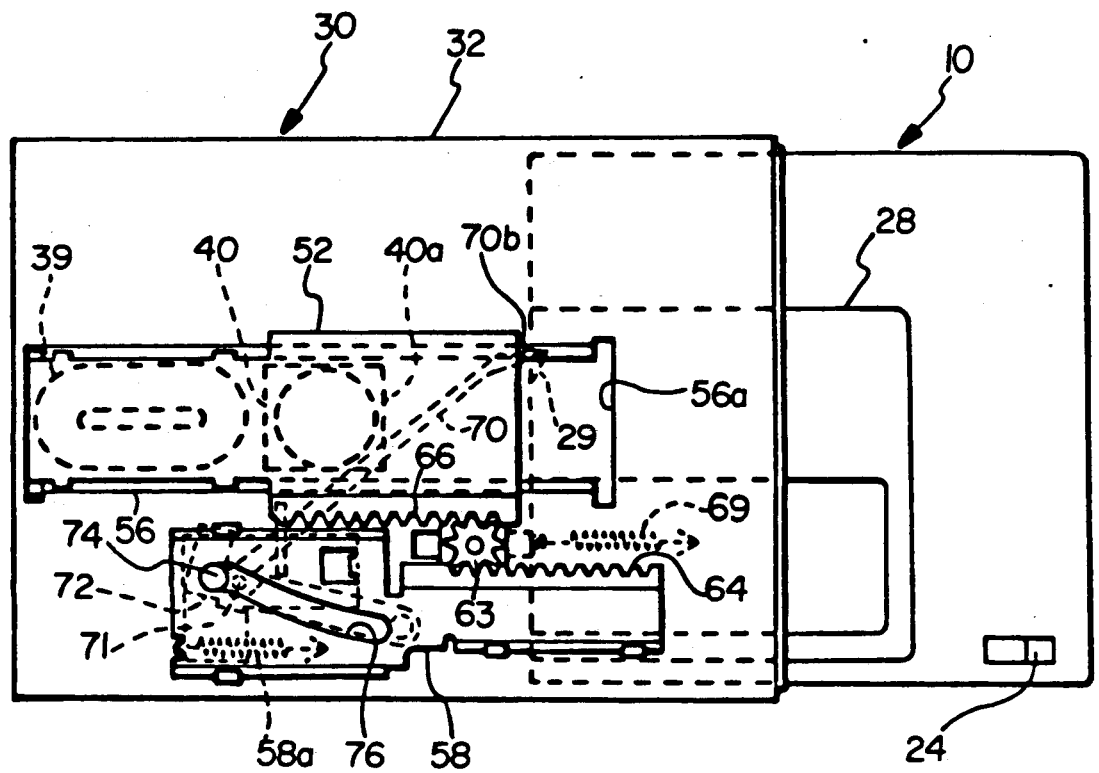
FIGS. 4A-4C are top plan views of one embodiment of the shutter opening apparatus of the present invention illustrating the operation thereof.
Figure 4B:
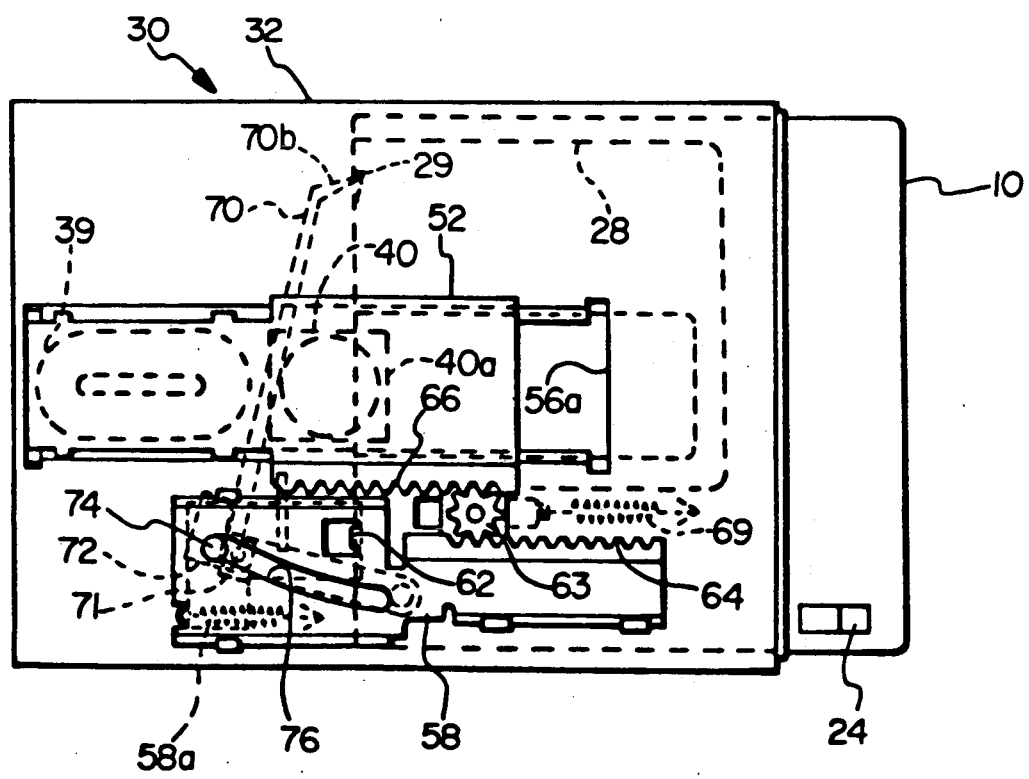
Figure 4C:
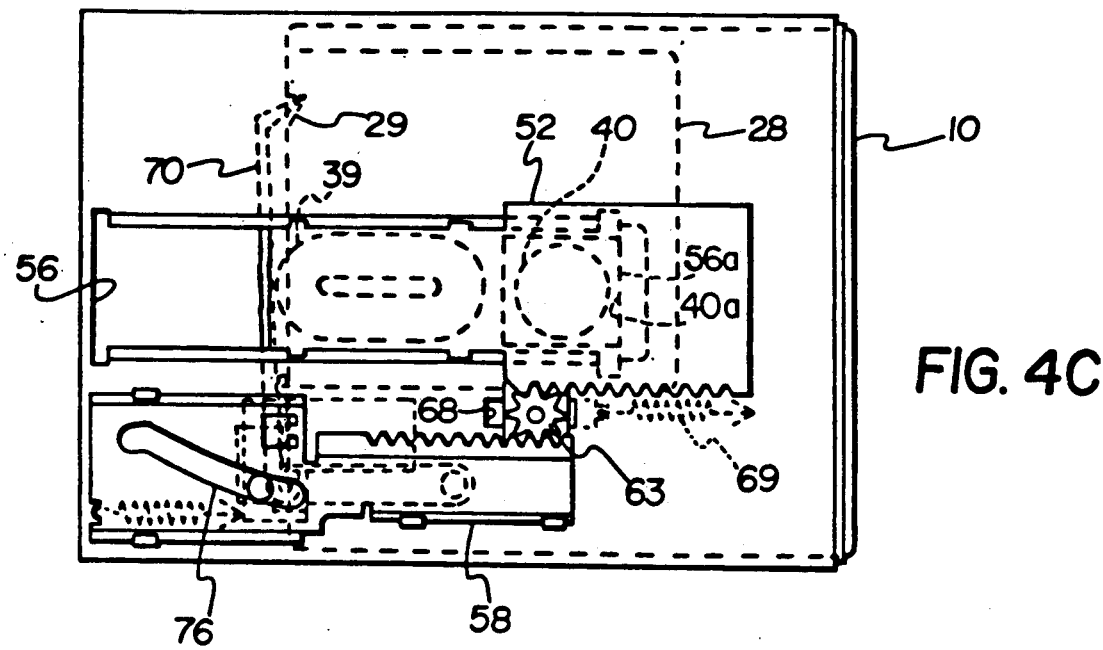

Referring now to FIGS. 4A-4C, the operation of the clamp positioning apparatus of the invention will now be described. FIG. 4A shows the first phase of cartridge insertion in which cartridge 10 is inserted to the point at which shutter notch 29 engages the pointed end 70b of shutter opening lever 70. At this stage, the cartridge is sufficiently inside disk drive system 30 that the segment of recording tracks that will be exposed by opening of shutter 28 are completely enclosed within and therefor protected by the guide means comprised of upper and lower guide plates 32,34. In fact, considering the cabinet in which the disk drive system is enclosed, most if not all of the access aperture 26 of cartridge 10 is inside the cabinet and disk is entirely protected from accidental contact by the user. Mount plate 52, from which disk clamp 40 and bias coil 39 are dependent through slot 56, is in the fully retracted position at the rear of disk drive system 30 by virtue of the forward biasing effect of tension spring 58a on drive cam 58.

As the user continues to push cartridge 10 into the disk drive system toward the position shown in FIG. 4B, lever 70 is forced to pivot counterclockwise about pivot pin 71 moving shutter 28 transversely until it is completely opened as seen in FIG. 4B. At this stage, the leading edge of cartridge 10 has just come into contact with drive tab 62 of drive cam 58. Up to this point, it should be noted that pivot pin 71 has held stationary by virtue of the fact that pivotable mount arm 72 is prevented from moving due to follower pin 74 being captured at the end of curved cam slot 76 in drive cam 58. Now however, as the user continues to push on cartridge 10, cam 58 is forced toward the rear of the disk drive system. This has the dual effect of pivoting mount arm 72 counter-clockwise as follower pin 74 traverses curved cam slot 76 and of forcing mount plate 52 to translate forward due to the driving engagement of the double rack and pinion 63,64,66 with drive cam 58. At this juncture it should be noted that the spring force of pinion tension spring 69 is sufficient to hold pinion 63 stationary against the counter forces of the moving drive cam 58 and mount plate 52. Since shutter 28 has now been fully opened, disk clamp 40 is able to slide forward nested within the upper access aperture of cartridge 10 without interference from shutter 28.

As cartridge 10 is pushed inward beyond the position shown in FIG. 4B, pivoting lever 70 would normally bind in notch 29 since shutter 28 has moved transversely to its fully opened state which would prevent lever 70 from continuing to pivot through its normal arc. However, as drive cam 58 moves rearward, the action of curved cam slot 76 on follower pin 74 causes the aforementioned counterclockwise pivoting of arm 72 and the consequent transverse movement of pivot pin 71 away from notch 29 of shutter 28. By suitably selecting the curve of cam slot 76 so as to be complementary to the remaining arc that would otherwise be traversed by lever end 70b if pivot 71 remained stationary, lever end 70b travels in a straight line path parallel to the insertion path of cartridge 10 thus allowing the continued inward travel of the cartridge.

This dual action, i.e. forward translation of mount plate 52 and the movement/pivoting of lever 70 continues until the cartridge is fully inserted to its final operative position as shown in FIG. 4C. In this final position, the forward edge 40a of the base mount for disk clamp 40 is pressed against the forward end 56a of slot 56. In the illustrated preferred embodiment of the invention, end 56a comprises a precision stop which is designed to assure that clamp 40 is properly positioned in axial alignment with spindle-drive 42. Thus it is important to make certain that the base mount for clamp 40 is in position against end 56a and moreover that clamp 40 is held firmly against this stop during read/write functions so as not to impart any undesired motion or vibration to the disk during rotation.

Figure 5:
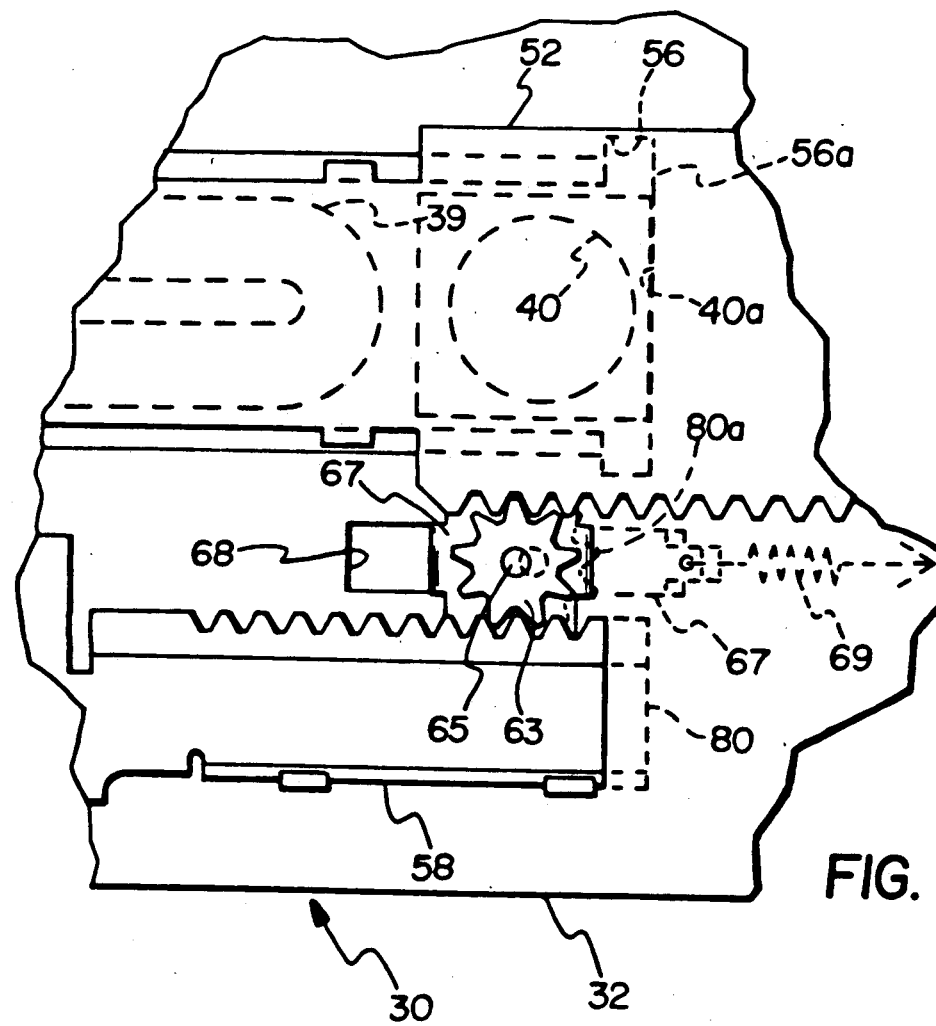
FIG. 5 is a detailed view of a portion of the clamp positioning apparatus of FIG. 3 useful in explaining the present invention.

Referring to FIG. 5, this feature of the invention is achieved without the use of costly close tolerance precision parts by the compliant mounting of pinion 63 on bracket 67 slidably mounted in slot 68 with tension spring 69 providing positive force urging pinion 63 toward the right in the drawing. When the forward edge 40a of the base mount for clamp 40 initially reaches the end 56a of slot 56, drive cam 58 is at position 80 and pinion 63 at position 80a as shown in phantom in the drawing. Cartridge 10, however, continues slightly further in the insertion direction forcing drive 58 to overtravel to its final position shown in solid outline. This overtravel is accommodated by the sliding motion of movable pinion 63 in slot 68. Preferably, the force of tension spring 69 is sufficient to counter any frictional resistance of cam 58 and bracket 52 to hold pinion 63 stationary during the cartridge insertion until the final stage at which overtravel of cam 58 occurs. In an actually constructed embodiment of the invention, a motor activated mechanism (not shown) is employed to positively seat the cartridge at the end of its insertion which also assists in causing the desired overtravel of drive cam 58 against the force of spring 69 as well as the restoring force of cam 58 bias spring 58a.

It will be appreciated that there has been described compact apparatus for positioning of a disk clamp in an optical or magneto-optical disk drive system that allows the insertion of a shuttered cartridge with the shutter maintained closed during a substantial portion of the insertion motion to protect the disk while at the same time avoiding interference between the disk clamp and the shutter. Moreover, the apparatus of the invention provides positive reliable seating of the clamp in its operative position without using costly, close tolerance precision parts.

It will also be appreciated that driving mechanisms may be used between the driving cam and clamp mounting plate other than the illustrated preferred embodiment of a double rack and pinion arrangement. For example, a bell crank lever may be employed with one end driven by a cam follower pin riding in an arcuate cam slot formed in the forward end of the drive cam to pivot the lever reciprocally as the disk cartridge is inserted and removed. With this arrangement, the other end of the bell crank lever is preferably coupled to the translatable clamp mounting plate by means of a tension spring that compliantly pulls the mounting plate forward to its seated position as the lever pivots while the cartridge is being inserted. The spring-coupled end of the bell crank lever is preferably also slidably captured in a channel formed crosswise on the mounting plate so as to drive the plate rearward as the lever pivots in the reverse direction when the drive cam moves forward during removal of the disk cartridge.

The invention has been described in detail with particular reference to a presently preferred embodiment, but it will be understood that variations and modifications can be effected within the spirit and scope of the invention.

What is claimed is:

1. An information storage disk drive system for use with a cartridge which at least partially encloses a disk, the information storage disk drive system comprising:
   a cartridge guide for receiving the cartridge along an insertion path;
   a disk spindle-drive positioned to be coaxially aligned with the disk when the cartridge containing the disk is loaded into a final operative position in the guide;
   a disk clamp for urging the disk against the spindle drive when the disk clamp is coaxially aligned with the spindle-drive;
   a disk clamp mounting plate upon which the disk clamp is mounted, the mounting plate being slidably mounted on the cartridge guide and being slidable in a path parallel to the insertion path between an operative position in which the mounting plate is positioned so that the disk clamp is coaxially aligned with the spindle-drive and a retracted position in which the disk clamp is displaced from alignment with the spindle-drive;
   a drive cam slidably mounted on the cartridge guide with a slide path parallel to the insertion path;
   means connected to the drive cam for engaging the cartridge to drive the drive cam along the slide path as the cartridge is inserted into the cartridge guide; and
   means for drivingly coupling the drive cam to the disk clamp mounting plate so that movement of the drive cam along the slide path as the cartridge is inserted into the cartridge guide causes movement of the disk clamp mounting plate from the retracted position to the opertive position, in which the means for drivingly coupling the drive cam to the mounting plate comprises:
   a first rack as part of the mounting plate;
   a second rack as part of the drive cam; and
   pinion means for drivingly coupling the first rack to the second rack.

2. The information storage disk drive system of claim 1 in which the pinion means is rotatably mounted to a slider, the slider being compliantly mounted on the cartridge guide to permit overtravel of the drive cam after the mounting plate is in its operative position on the cartridge guide.

3. The information storage disk drive system of claim 1 in which the pinion means is rotatably mounted on the cartridge guide.

* * * * *